(12) United States Patent
Lescoche

(10) Patent No.: US 9,731,229 B2
(45) Date of Patent: *Aug. 15, 2017

(54) FILTRATION SUPPORT GEOMETRY AND MEMBRANE

(75) Inventor: Philippe Lescoche, Piegon (FR)

(73) Assignee: TECHNOLOGIES AVANCEES ET MEMBRANES INDUSTRIELLES, Nyons (FR)

( * ) Notice: Subject to any disclaimer, the term of this patent is extended or adjusted under 35 U.S.C. 154(b) by 631 days.

This patent is subject to a terminal disclaimer.

(21) Appl. No.: 13/577,151

(22) PCT Filed: Mar. 4, 2011

(86) PCT No.: PCT/FR2011/050458
§ 371 (c)(1),
(2), (4) Date: Nov. 12, 2012

(87) PCT Pub. No.: WO2011/110780
PCT Pub. Date: Sep. 15, 2011

(65) Prior Publication Data
US 2013/0199991 A1    Aug. 8, 2013

(30) Foreign Application Priority Data

Mar. 10, 2010 (FR) .................................... 10 51739
Nov. 22, 2010 (FR) .................................... 10 59595

(51) Int. Cl.
*B01D 29/00* (2006.01)
*B01D 29/03* (2006.01)
(Continued)

(52) U.S. Cl.
CPC ....... *B01D 29/0043* (2013.01); *B01D 29/009* (2013.01); *B01D 29/0056* (2013.01);
(Continued)

(58) Field of Classification Search
CPC ........ B01D 29/01; B01D 29/03; B01D 29/44; B01D 29/0043; B01D 29/23; B01D 29/35;
(Continued)

(56) References Cited

U.S. PATENT DOCUMENTS

| 3,398,833 A | * | 8/1968 | Marks ..................... | B01D 61/08 |
| | | | | 210/321.84 |
| 4,069,157 A | * | 1/1978 | Hoover et al. ........... | 210/321.82 |

(Continued)

FOREIGN PATENT DOCUMENTS

| EP | 0 778 073 | 6/1997 |
| EP | 0 778 074 | 6/1997 |

(Continued)

*Primary Examiner* — Joseph Drodge
(74) *Attorney, Agent, or Firm* — Clark & Brody

(57) ABSTRACT

A filtering element for the filtration of a fluid medium comprises a rigid porous support of cylindrical shape having a longitudinal central axis (A) and a plurality of channels for the circulation of the fluid medium to be filtered and collection of filtrate on the periphery of the support. The channels are arranged in the support parallel to its central axis central (A) and define at least three filtering zones which are distributed concentrically and separated from each other by a continuous porous zone. The mean thickness of the porous zone ($Z_1$) closest to the central axis (A) is smaller than the mean thickness of the porous zone ($Z_{n-1}$) the closest to the periphery of the support (1) and, in the direction moving away from the central axis (A) of the support towards its periphery, the mean thickness of a porous zone is either identical to the next or smaller.

21 Claims, 4 Drawing Sheets ez1 to ez4 are the relevant thicknesses which have to increase according to the invention.
d1 to d4 are the thicknesses of the circumferential walls which increase in Table II and the corresponding Figure 3 of D1.

(51) Int. Cl.
  *B01D 69/04* (2006.01)
  *B01D 63/06* (2006.01)
(52) U.S. Cl.
  CPC ......... *B01D 29/035* (2013.01); *B01D 63/066* (2013.01); *B01D 69/04* (2013.01); *B01D 69/046* (2013.01); *B01D 2313/146* (2013.01)
(58) Field of Classification Search
  CPC .... B01D 29/52; B01D 46/24; B01D 46/2451; B01D 46/2455; B01D 46/2466; B01D 46/247; B01D 46/2474; B01D 46/2488; B01D 63/06; B01D 63/066; B01D 63/08; B01D 69/04; B01D 69/046; B01D 17/0202; B01D 2313/146; B01D 2313/346; B01D 2046/2488; B01D 2046/2496; B01D 69/10; B01D 29/009; B01D 29/0054; B01D 29/0056; B01D 29/0059; B01D 29/035; B01D 17/02; B01D 2319/025; B01D 2319/04; B01D 2325/08
  USPC ...... 210/321.75, 321.8, 321.84, 321.89, 483, 210/489, 490, 495, 500.22, 500.25, 210/500.26
  See application file for complete search history.

(56) References Cited

U.S. PATENT DOCUMENTS

| | | | | |
|---|---|---|---|---|
| 5,454,947 | A | * | 10/1995 | Olapinski et al. .......... 210/510.1 |
| 5,641,332 | A | * | 6/1997 | Faber et al. ..................... 55/523 |
| 5,853,582 | A | * | 12/1998 | Grangeon et al. ....... 210/321.89 |
| 6,077,436 | A | * | 6/2000 | Rajnik ................... B01D 53/22 210/321.82 |
| 6,126,833 | A | * | 10/2000 | Stobbe ................... B01D 53/22 210/490 |
| 7,384,549 | B2 | * | 6/2008 | de los Reyes et al. .. 210/321.72 |
| 9,522,351 | B2 | * | 12/2016 | Lescoche ............. B01D 63/066 |
| 2003/0155290 | A1 | * | 8/2003 | Chanaud .................... 210/321.6 |
| 2005/0042151 | A1 | * | 2/2005 | Alward et al. ................ 422/177 |
| 2011/0100900 | A1 | * | 5/2011 | Drury ................ B01D 46/2429 210/490 |
| 2014/0021127 | A1 | * | 1/2014 | Lescoche ..................... 210/420 |

FOREIGN PATENT DOCUMENTS

| | | |
|---|---|---|
| EP | 0 780 148 | 6/1997 |
| WO | 93/07959 | 4/1993 |
| WO | 00/29098 | 5/2000 |
| WO | WO 0029098 A1 * | 5/2000 |

* cited by examiner ez1 to ez4 are the relevant thicknesses which have to increase according to the invention.

d1 to d4 are the thicknesses of the circumferential walls which increase in Table II and the corresponding Figure 3 of D1.

FILTRATION SUPPORT GEOMETRY AND MEMBRANE

The present invention concerns the technical field of tangential separation using filtering elements adapted to ensure the separation of molecules or particles contained in a fluid medium to be treated. The subject of the invention more specifically concerns novel filtration elements comprising a rigid porous support in which channels for circulation of the fluid to be filtered are arranged, said support having original geometry.

The subject of the invention finds particularly advantageous application in the fields of nanofiltration, ultrafiltration, microfiltration, filtration or reverse osmosis.

In the state of the art, numerous filtering elements are known prepared from a tubular or planar support. In particular, filtering elements of tubular type have been proposed comprising a porous support in inorganic material for example e.g. ceramic, in which a series of channels is arranged. This support may be associated with one or more separating layers e.g. in inorganic material deposited on the surface of each circulation channel that are linked together and to the support via sintering. These layers allow the adjustment of the filtering property of the filtering element.

In the field of tubular filtering elements, the rigid porous support is of elongate shape and has a straight cross-section, most often polygonal or circular. Numerous supports comprising a plurality of channels parallel to each other and to the longitudinal axis of the porous support have already been proposed, in particular by the Applicant. For example, filtering elements comprising a series of non-circular channels are described in patent application WO 93 07959 by CERASIV, patent application EP 0780148 by CORNING, patent application WO 00/29098 by ORELIS and patents EP 0778073 and EP 0778074 to the Applicant. For example, FIG. 3 in patent application WO 93 07959 is a cross-sectional view of a support in which channels are arranged parallel to the central axis thereof. These channels define three filtering zones which are concentrically distributed and separated from each other by a continuous porous zone denoted $Z'_1$ and $Z'_2$ in appended FIG. 1. When functioning, the channels communicate on one side with an inlet chamber for the fluid medium to be treated, and on the other side with an outlet chamber. The surface of the channels is most often coated with at least one separating layer ensuring the separation of the molecules or of the particles contained in the fluid medium circulating inside the channels, in a given direction, from one so-called inlet end of the channels to the other so-called outlet end. Via a sieve effect, said filtering element achieves separation of the molecular or particulate species of the product to be treated, insofar as all the particles or molecules of greater diameter than the pores of the zone of the filtering element with which they are in contact are retained. During the separation, the transfer of the fluid takes place through the support and optionally the separating layer(s) if present, and the fluid spreads into the porosity of the support and is directed towards the outer surface of the porous support. The part of the fluid to be treated which passes through the separation layer and the porous support is called "permeate" or "filtrate" and is recovered in a collecting chamber surrounding the filtering element.

The Applicant has found that said supports are subjected to strong stresses, having regard to the pressures applied during filtering operations, and could have points of weakness at some points of their structure. In particular, the Applicant has evaluated the stress fields existing within supports of the type previously mentioned and has evidenced that maximum stress increases in the direction moving away from the centre towards the outside of the support.

Therefore, anxious to improve the performance levels of its filtering elements, the Applicant in the present invention proposes a novel support geometry for the purpose of optimizing the mechanical performance of the filtering elements proposed in the prior art.

Within this context, the present invention concerns a filtering element for the filtration of a fluid medium comprising a rigid porous support of cylindrical shape having a longitudinal central axis and comprising a plurality of channels for the circulation of the fluid medium to be filtered with a view to collecting a filtrate on the periphery of the support, said channels being arranged in the support parallel to its central axis and defining at least three filtering zones which are concentrically distributed and separated from each other by a continuous porous zone, characterized in that the mean thickness of the porous zone the closest to the central axis is smaller than the mean thickness of the porous zone the closest to the periphery of the support, and on moving away from the central axis of the support towards the periphery thereof the mean thickness of a porous zone is either identical to the next zone or smaller.

Each porous zone lies between two filtering zones, each filtering zone comprising a channel or plurality of channels. Each continuous porous zone may in particular be defined as the zone contained between the outer envelope of a filtering zone and the inner envelope of the adjacent filtering zone in the direction moving away from the centre towards the periphery of the support. To define an inner envelope, it is considered that the lowest point (also called inner or centripetal point) of a channel of a filtering zone is the point of the channel the closest to the centre of the porous support. Then it is considered that the inner envelope is the curve linking together the lowest points of each channel of one same filtering zone, being tangent to the wall of each channel at its lowest point. According to one embodiment, for each of the filtering zones, the lowest points of each channel of one same filtering zone are located on a circle whose centre is the centre of the support, and this circle corresponds to the inner envelope.

To define an outer envelope, it is considered that the highest point (also called external or centrifugal point) of a channel of a filtering zone is the point of the channel the furthest away from the centre of the porous support. Then, it is considered that the outer envelope is the curve linking the highest points of each channel of one same filtering zone, being tangent to the wall of each channel at its highest point. According to one embodiment, for each of the filtering zones, the highest points of each channel of one same filtering zone are located on a circle whose centre is centre of the support, and this circle corresponds to the outer envelope.

By "mean thickness" of a porous zone is meant the arithmetic mean. According to one variant of embodiment of the invention, the porous zone may have a constant thickness. According to one particular embodiment, particularly illustrated in the Figures detailed below, the outer envelope and the inner envelope delimiting each porous zone are defined as being two concentric circles and each porous zone is therefore of constant thickness. Regarding the support illustrated in FIG. 3 of patent application WO 93 07959 each porous zone $Z'_1$ and $Z'_2$ is also delimited by two concentric circles but, contrary to the invention, the porous zone $Z'_1$ is of greater thickness than the porous zone $Z'_2$, as can be seen in FIG. 1.

If the filtering zone is formed of a single central channel of circular shape, the inner envelope and the outer envelope are merged and correspond to the contour of the channel.

The porous zones are said to be continuous since there is a distinct delimitation between adjacent (or successive) filtering zones i.e. there is no mingling or overlap between two adjacent filtering zones. In other words a channel of one filtering zone cannot, even only in part, lie between two channels of an adjacent filtering zone.

According to particular embodiments which will be detailed in the following description, the filtering elements according to the invention may have one or other of the characteristics below or any combination of these characteristics:

- the mean thickness between two adjacent continuous porous zones having a different mean thickness varies by a factor of 1.01 to 3.00 and preferably from 1.10 to 1.70,
- the ratio between the mean thickness of the porous zone the closest to the periphery of the support over the mean thickness of the porous zone the closest to the central axis lies in the range of 1.1 to 6, preferably in the range of 1.2 to 2.5. In relation to the number of porous zones, the variations in thickness between two successive porous zones will therefore be chosen to reach said ratio.
- the mean thickness of the peripheral zone separating the outer surface of the support from the filtering zone the closest to the outer surface of the support is greater than the mean thickness of the porous zone separating the filtering zone the closest to the outer surface of the support from the adjacent filtering zone,
- the channels of one same filtering zone having several channels are all identical,
- the support comprises a central channel e.g. of circular shape alone defining a filtering zone,
- the number of channels present in each filtering zone increases in the direction moving away from the centre towards the periphery of the support,
- the support is of circular or polygonal cross-section,
- the surface of the channels is coated with at least one inorganic filtration layer,
- at least two of the filtering zones correspond to a filtration crown comprising several channels and in which the channels are separated by porous partitions allowing the permeate to pass,
- the porous zones are concentric in the centre of the support,
- the filtering zones consists solely of one central circular channel alone defining a filtering zone and of a series of filtering zones each corresponding to a filtration crown which comprises several channels and in which the channels are separated by porous partitions allowing the permeate to pass, the filtration crowns being distributed concentrically to the central channel,
- if filtration crowns are present, these may have one or other of the following characteristics or any combination of these characteristics:
  - the widths of the flow-through partitions are equal within one same crown and equal from one crown to another,
  - the width of each flow-through partition is constant over its entire length,
  - the filtration crowns are distributed over concentric circles,
  - in each filtration crown, the channels are of circular or non-circular cross-section and for example have a trapezoidal cross-section,
  - the different channels of the filtration crowns have an axis of symmetry that is radial relative to the centre of the support,
  - in each filtration crown, the channels are all identical,
  - the support comprises at least four filtration crowns.

Various other characteristics will become apparent from the description given below with reference to the appended drawings which, as non-limiting examples, illustrate embodiments of the supports according to the invention.

In the entirety of the description, the notions of thickness, width, cross-section and direction within the support are to be construed over a straight cross-section of the support. On a straight cross-section of the support the terms axis of the support and centre of the support will be used indifferently.

Figure 1:
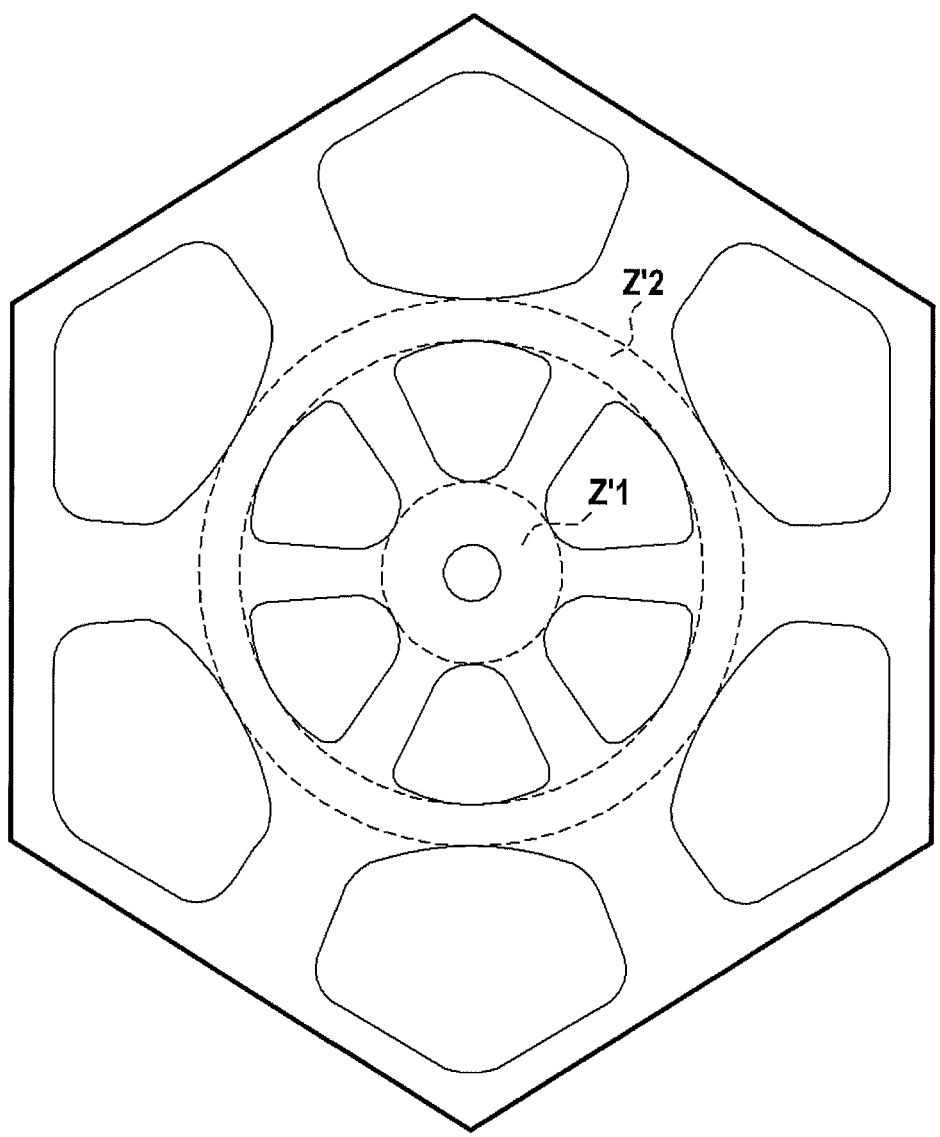
FIG. 1 is a cross-sectional view of a filtering element according to the prior art WO 93 07959.
Figure 2A:
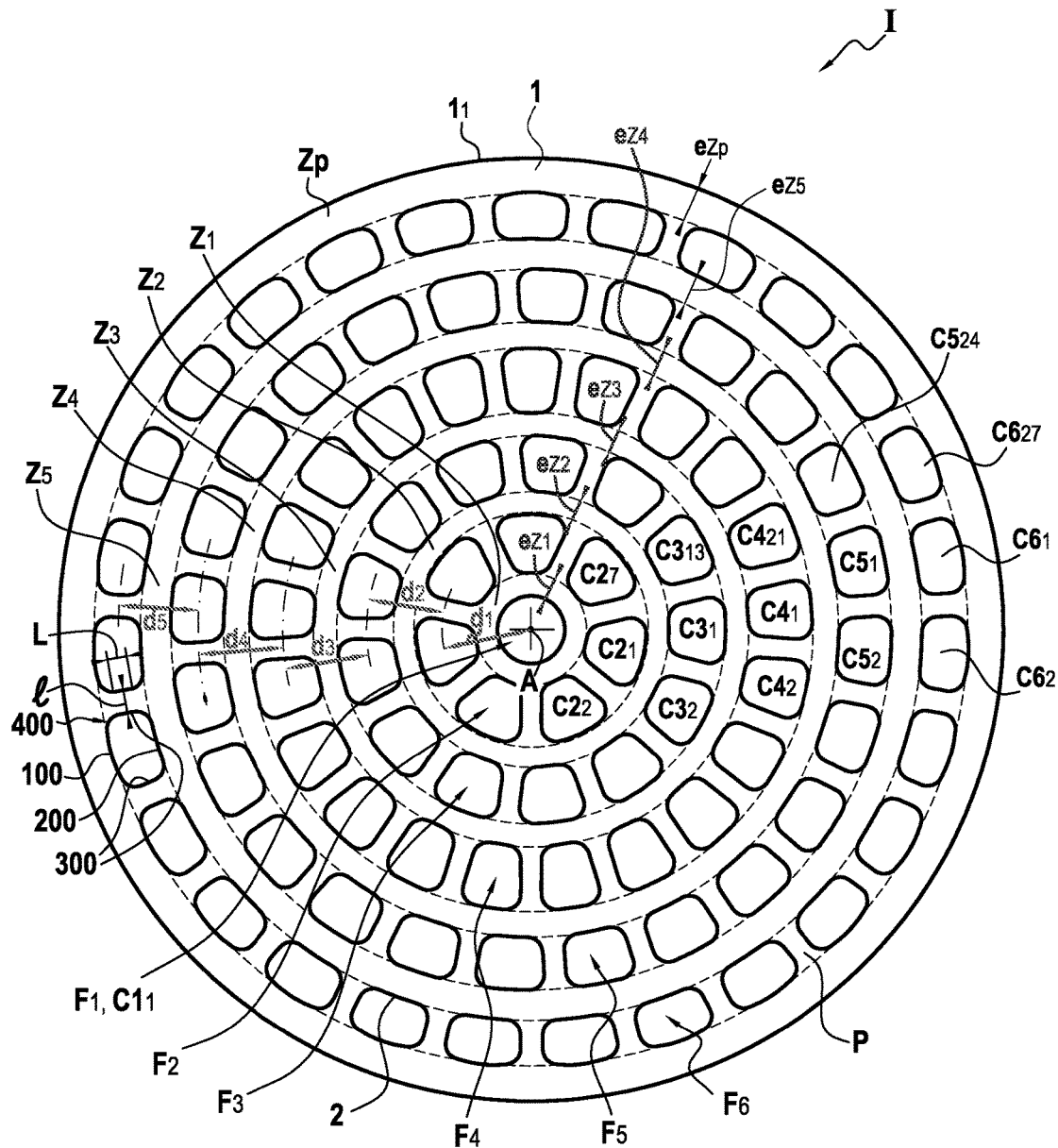
FIG. 2A is a cross-sectional view of an example of embodiment of a filtering element according to the invention.

As can be seen in FIG. 2A, the inorganic filtering element I is of adapted shape to ensure the separation or filtration of molecules or particles contained in a fluid medium, preferably liquid, of diverse type which may or may not contain a solid phase. The filtering element I comprises a rigid porous support 1 formed of a material whose transfer resistance is adapted to the separation to be conducted. In particular, the support 1 is formed of one or more inorganic materials such as metal oxides (titanium dioxide, alumina, zirconium in particular), carbon, silicon carbide or nitride or metals. The support I is of elongate shape or in the shape of a conduit extending along a longitudinal central axis A. The porous support 1 generally has an equivalent mean pore diameter of between 2 and 12 µm. The support 1 has a straight cross-section which may hexagonal or, in the embodiment illustrated in the Figures, circular. The support 1 therefore affords a cylindrical outer surface $1_1$.

The support 1 is arranged to comprise a plurality of channels $C_{11}$, $C_{21}$, $C_{22}$ ..., $C_{27}$, $C_{31}$, $C_{32}$ ..., $C_{313}$ ... (generally designated $C_{ij}$) formed parallel to the axis A of the support. The channels $C_{ij}$ each have a surface 2 which may be coated with at least one separating layer, not illustrated, intended to be in contact with the fluid medium to be treated circulating inside the channels. The type of separating layer or layers is chosen in relation to the separating or filtering property to be obtained, and together with the support form a close connection so that the pressure originating from the liquid medium is transmitted to the porous support 1. This or these layers can be deposited from suspensions for example containing at least one metal oxide of titanium dioxide, alumina or zirconium type in particular, optionally in a mixture and conventionally used for the production of mineral filtering elements. This or these layers, after drying, are subjected to a sintering operation for consolidation thereof and to bind them to each other and to the porous support 1.

According to the invention, the support 1 comprises at least three filtering zones $F_1$, $F_2$, $F_3$ ... $F_n$ (generally designated $F_i$) which are distributed concentrically. Two adjacent (i.e. successive) filtering zones are separated by a continuous porous zone $Z_1$ to $Z_{n-1}$. Each porous zone $Z_i$ is therefore inserted between two adjacent filtering zones $F_i$. In the remainder of the description it is considered that the filtering zones occupy different rows which increase in the direction of the periphery of the support. Therefore, for two porous zones under consideration, the porous zone the closest to the periphery is considered to be of an upper row compared with a porous zone closer to the centre considered to be a porous zone of a lower row.

According to one essential characteristic of the invention, the mean thickness of the porous zone $Z_{n-1}$ is greater than the mean thickness of the porous zone $Z_1$. For at least some porous zones therefore, there is an increase in the mean thickness from one porous zone to the next, in the direction towards the periphery of the support 1, i.e. towards its outer surface $1_1$. In other words, the mean thickness of a porous zone of an upper row is identical to or greater than the mean thickness of a porous zone of an adjacent lower row, the mean thickness of at least one porous zone of a lower row being smaller than the mean thickness of at least one porous zone of an upper row.

In the example illustrated in FIG. 2A, the support comprises six filtering zones $F_1$ to $F_6$. The first filtering zone $F_1$ is formed of one and only central channel $C_{11}$, which in particular allows an accumulation of material to be prevented in the centre of the support. In the illustrated example, the central channel $C_{11}$ is of circular shape, but a shape of octagonal type or other shape could also be provided. The use of a single central channel, compared with a group of channels in a petal arrangement starting from the central axis A of the support 1 as is described in patent application WO 00/29098 by ORELIS, contributes to obtaining good mechanical strength. The presence of a single central channel effectively allows the presence of porous material in the centre of the support to be avoided, and thereby reinforces the mechanical strength thereof.

The other filtering zones $F_2$ to $F_6$ are each composed of a series of channels. Each of these filtering zones corresponds to a filtration crown in which the channels are separated by flow-through partitions P for the filtrate. These flow-through partitions P enable the filtrate to make its way inside the support from one porous zone to another, as far as the peripheral zone Zp, also porous, ending its pathway on the outer surface $1_1$ of the support 1.

These filtration crowns $F_2$ to $F_6$ are distributed as follows in the direction moving away from the central axis A towards the periphery of the support:
- the second filtering zone $F_2$ is formed of a crown of 7 identical channels $C_{21}$ to $C_{27}$ of trapezoidal shape,
- the third filtering zone $F_3$ is formed of a crown of 13 identical channels $C_{31}$ to $C_{313}$ of trapezoidal shape,
- the fourth filtering zone $F_4$ is formed of a crown of 21 identical channels $C_{41}$ to $C_{421}$ of trapezoidal shape,
- the fifth filtering zone $F_5$ is formed of a crown of 24 identical channels $C_{51}$ to $C_{524}$ of trapezoidal shape, and
- the sixth filtering zone $F_6$ is formed of a crown of 27 identical channels $C_{61}$ to $C_{627}$ of trapezoidal shape.

The number of channels present in each filtering zone therefore increases on moving away from the centre towards the periphery of the support. These filtration crowns $F_2$ to $F_6$ are distributed concentrically to the central channel. The barycentres of the channels $C_{21}$, $C_{22}$ ... $C_{27}$ of the second filtering zone $F_2$ are located on a circle coaxial to the central axis A, this coaxial circle having a smaller diameter than the coaxial circle on which the barycentres of channels $C_{31}$, $C_{32}$ ... $C_{313}$ of the third filtering zone $F_3$ are located, and so forth.

The last filtering zone $F_6$ is separated from the outer surface $1_1$ of the support 1 by a peripheral zone Zp. This peripheral zone Zp can be defined as the zone existing between the outer surface $1_1$ of the support 1 and the curve connecting the outer points (also called centrifugal or highest points) of each channel of the last filtering zone $F_6$. This curve can be defined as previously, namely tangent to the wall of each channel at the highest point of its wall or, if said curve is secant with the outer contour $1_1$ of the support 1, as the curve which passes through the highest points of the channels of the filtering zone the closest to the periphery of the support, being homothetic to the outer surface $1_1$ of the support.

In the illustrated example, for each of the filtering zones, the centripetal points of each channel of one same filtering zone are located on a circle whose centre is the centre of the support, this circle corresponding to the inner envelope of the filtering zone under consideration. Similarly, for each of the filtering zones, the centrifugal points of each channel of one same filtering zone are located on a circle whose centre is the centre of the support, this circle corresponding to the outer envelope of the filtering zone under consideration. Therefore, the outer envelope and the inner envelope delimiting each porous zone are two concentric circles and each porous zone is therefore of constant thickness. The distance (corresponding to the thickness $e_{z1}$ of the porous zone $Z_1$) separating the central channel $C_{11}$ from the adjacent filtering zone, namely the second filtering zone $F_2$, is smaller than the distance (corresponding to the thickness $e_{z5}$ of the porous zone $Z_5$) separating the last filtering zone $F_6$ from the adjacent filtering zone in the direction of the centre of the support, namely the fifth filtering zone $F_5$. This increase in the thickness of at least some of the porous zones in the direction moving away from the central axis of the support is provided to minimize the pressure effect exerted by the retentate, or by hydraulic incidents generated by the functioning of the installation such as water hammering. For this purpose, in the illustrated example, starting from the third porous zone $Z_3$, if consideration is given to two successive porous zones, the ratio between the mean thickness of the outermost porous zone over the mean thickness of the closest porous zone in the direction of the centre of the support, is always higher than 1. In the example illustrated FIG. 2A, the porous zones $Z_1$, $Z_2$ and $Z_3$ are of identical thickness. As from the porous zone $Z_3$, the mean thickness of the filtering zones increases in the direction of the periphery $1_1$ of the support. The thickness ratios $e_{z4}/e_{z3}$ and $e_{z5}/e_{z4}$ are between 1.14 and 1.17.

So as further to increase the mechanical strength of the filtering element, in the example illustrated FIG. 2A, the peripheral zone Zp separating the last filtration crown $F_6$ from the outer surface $1_1$ of the support 1 is also greater than the mean thickness of the porous zone $Z_5$. Nevertheless, according to one non-preferred variant, provision could be made so that this peripheral porous zone Zp has a thickness identical to the thickness of the porous zone $Z_5$. In the example illustrated FIG. 2A, the mean thickness of the peripheral zone Zp corresponds to about 1.13*the mean thickness of the porous zone $Z_5$.

To evidence the contribution made by the invention, a study was conducted to evaluate the stress fields existing within the support when loading corresponding to a pressure of 100 bars is applied in each of the channels. A support conforming to FIG. 2A was compared with a support conforming to FIG. 2B prepared for comparison purposes and in which the mean thicknesses of the porous zones $Z_1$ to $Z_5$ are identical and are 0.7 mm.

The results obtained with Abaqus software are summarized below in TABLES 1 and 2.

TABLE 1

Support conforming to the invention as per FIG. 2A

| Porous zone (from the centre towards the periphery) | Thickness (mm) | Mean stress (Mpa) |
|---|---|---|
| 1 | 0.6 | 11.9 |
| 2 | 0.6 | 11.7 |
| 3 | 0.6 | 11.7 |
| 4 | 0.7 | 10.8 |
| 5 | 0.8 | 11.7 |
| P | 0.9 | 10.06 |

TABLE 2

Figure 2B:
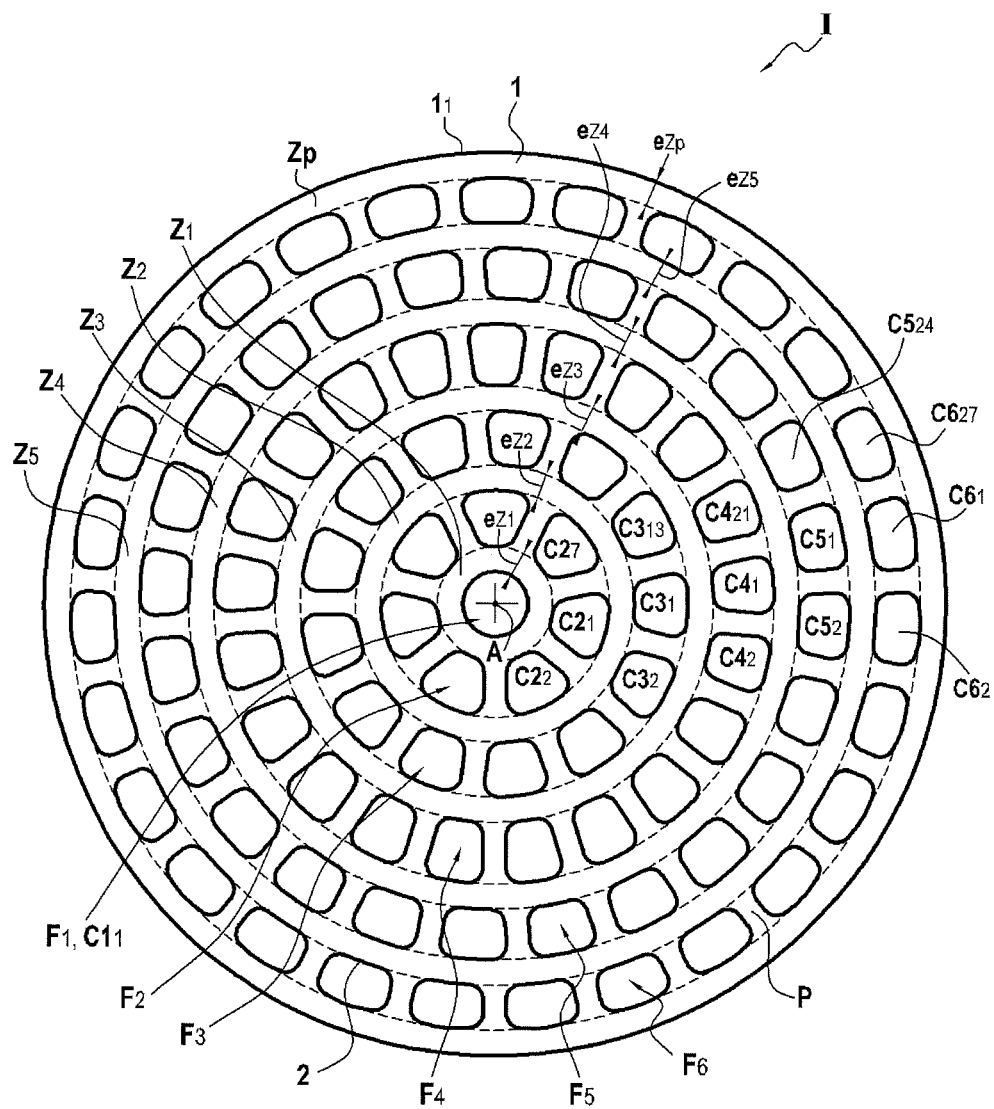
FIG. 2B is a cross-sectional view of a filtering element given by way of comparison, similar to the one in FIG. 2A but in which all the porous zones are of constant thickness.

Comparative support as per FIG. 2B

| Porous zone (from the centre towards the periphery) | Mean stress (Mpa) |
|---|---|
| 1 | 14 |
| 2 | 14.5 |
| 3 | 15.7 |
| 4 | 17 |
| 5 | 18 |
| P | 19.9 |

These results clearly evidence that the novel distribution of thickness conforming to the invention allows a significant decrease in the mean stress value, and provides for a more homogeneous distribution of these stresses.

In addition, the value of the maximum stress calculated for FIG. 2A is 58.8 Mpa, compared with 67.4 Mpa for FIG. 2B. The novel distribution of thickness conforming to the invention therefore significantly reduces local zones of weakness.

Figure 3:
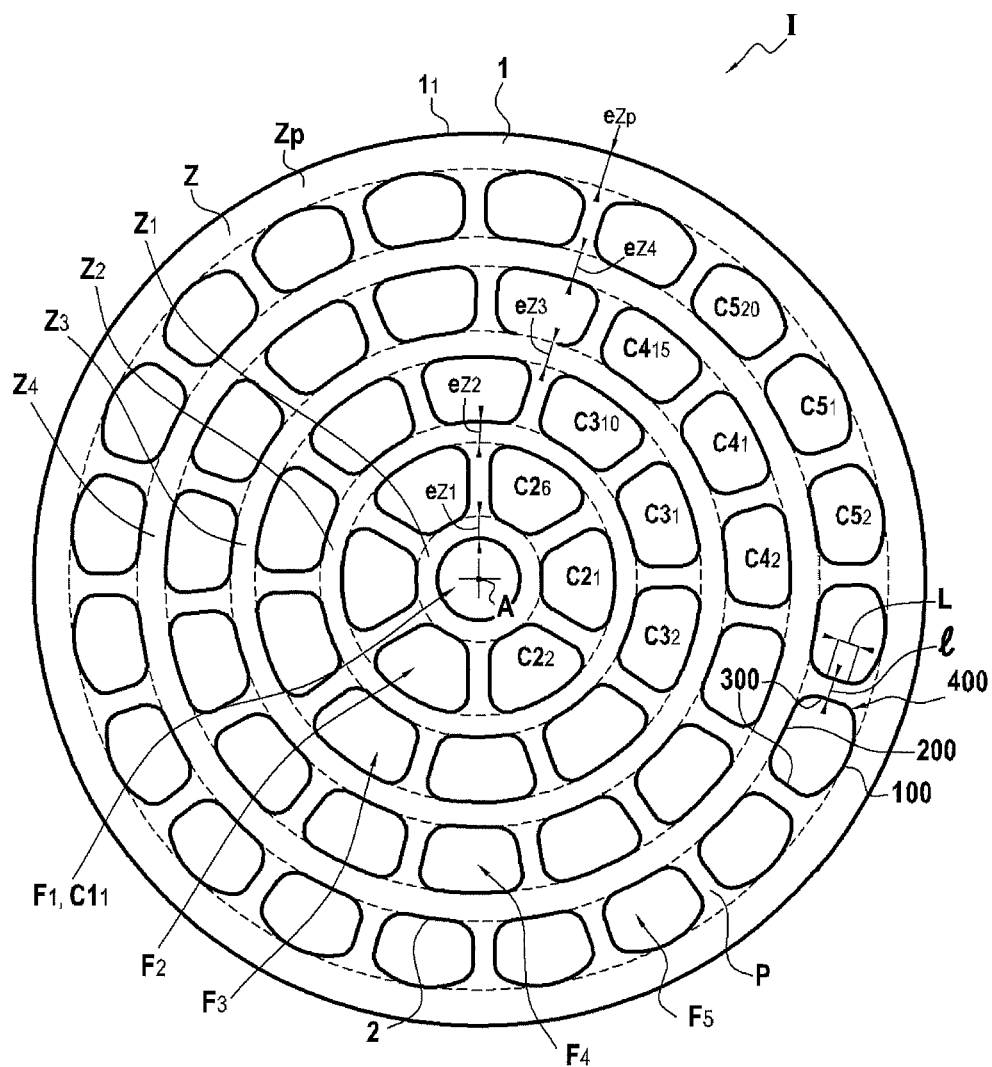
FIG. 3 is a cross-sectional view of another example of embodiment of a filtering element conforming to the invention.

FIG. 3 illustrates another example of embodiment of the invention in which the support 1 comprises 5 filtering zones F. These filtering zones are distributed as follows in the direction moving away from the central axis A towards the periphery $1_1$ of the support 1:

the first filtering zone $F_1$ is formed of a single central channel $C_{11}$ of cylindrical shape,
the second filtering zone $F_2$ is formed of a crown of 6 identical channels $C_{21}$ to $C_{26}$ of trapezoidal shape,
the third filtering zone $F_3$ is formed of a crown of 10 identical channels $C_{31}$ to $C_{310}$ of trapezoidal shape,
the fourth filtering zone $F_4$ is formed of a crown of 15 identical channels $C_{41}$ to $C_{415}$ of trapezoidal shape, and
the fifth filtering zone $F_5$ is formed of a crown of 20 identical channels $C_{51}$ to $C_{520}$ of trapezoidal shape.

According to the essential characteristic of the invention, the distance (corresponding to the thickness $e_{z1}$ of the porous zone $Z_1$) separating the central channel $C_{11}$ from the adjacent filtering zone, namely the second filtering zone $F_2$, is smaller than the distance (corresponding to the thickness $e_{z4}$ of the porous zone $Z_4$) separating the last filtering zone $F_5$ from the adjacent filtering zone in the direction of the central axis A of the support, namely the fourth filtering zone $F_4$, and so forth as far as the second filtering zone $F_2$. The porous zones $Z_1$ and $Z_2$ have identical thickness ($e_{z1}=e_{z2}$) whereas the thicknesses of the porous zones increase from zone $Z_2$ to zone $Z_4$, from the centre towards the periphery of the support ($e_{z2}<e_{z3}<e_{z4}$).

In the example illustrated FIG. 3, as in the example illustrated FIG. 2A, the peripheral zone Zp separating the last filtration crown $F_5$ from the outer surface $1_1$ of the support 1 is also greater than the mean thickness of the last porous zone $Z_4$.

If the support according to the invention comprises at least 4 filtering zones F, which is the case in the examples shown FIGS. 2A and 3, it may be chosen to apply the same factor of thickness variation from one porous zone to the next in the direction moving away from the central axis of the support towards its periphery, or to apply a different factor.

In the invention, as illustrated in FIGS. 2A and 3, the filtering zones may solely correspond to a single central channel $C_{11}$ and to crowns of channels such as defined in the invention and distributed concentrically relative to the central axis of the support.

Similarly, in the invention, as illustrated in FIGS. 2A and 3, the different channels of the filtration crowns may have a radial axis of symmetry relative to the centre of the support for the purpose of optimizing the filtering surface, but other configurations could be provided.

Also, in the invention as illustrated in FIGS. 2A and 3, when the support comprises more than three porous zones it is possible that only some of the porous zones are of different thickness. The porous zones Z the closest to the centre of the support may be of identical thickness, whereas only the one, two or three last porous zones, depending on the number of porous zones, are of increasing thickness in the direction moving away from the centre A towards the periphery of the support 1. Nevertheless, it could be envisaged that all the porous zones have a different mean thickness increasing from the centre A towards the periphery of the support 1.

In the invention, as illustrated in FIGS. 2A, 2B and 3, the channels of the different crowns are advantageously arranged at regular, identical intervals on their respective crown, but other configurations could also be provided.

According to another characteristic illustrated in the different examples of embodiment of the invention, all the flow-through partitions P (also called flow-through and connecting passageways) have an axis of symmetry which passes through the centre of the support.

In addition, the flow-through partitions P, within one same crown, preferably have substantially identical thicknesses l. According to one embodiment, particularly illustrated in FIGS. 2A and 3, provision is made so that the width l of the flow-through passageways P arranged between two adjacent channels of a crown is constant over their entire length L. Evidently, the width l of a flow-through passageway P is to be taken as the distance separating the two side walls 300 of the two channels by which it is delimited. This width l is also identical from one filtration crown to another. The Applicant has ascertained that the variations in width of the permeate passageways, such as described in patent applications WO 93 07959 by CERASIV and EP 0780148 by CORNING, necessarily lead to points of narrow width which systematically become points of weakness having regard to the mechanical stresses to which the filtering element is subjected. The use of permeate passageways towards the periphery that are of constant width l provides for optimization of the mechanical characteristics of the filtering element. If a comparison is made between a passageway of constant width l and a passageway whose width increases from the centre towards the periphery of the support, whilst maintaining constant the section and number of channels defining these passageways, the narrowest width of the passageway of varying width is smaller than the width of the passageway of constant width, and this point of narrower width therefore becomes a point of mechanical weakness. The choice of a passageway of constant width l also provides for a better manufacturing yield since extrusion pressures are more homogeneous.

The width l of a passageway can be defined in the following manner. Within each crown, the channels have non-circular straight sections. In the illustrated examples, the channels of the crowns are of trapezoidal shape. They have a wall 100 facing the periphery $1_1$ of the support (called outer wall), a wall 200 facing the centre A of the support (called inner wall), and two side walls 300 connecting the inner wall 200 with the outer wall 100. Most often, the side walls 300 are connected to the inner 200 and outer 100 walls by connecting fillets. In some cases, the inner wall may be replaced by a fillet 400 connecting the two side walls 300. A radial wall 300 is formed by a segment of a straight line L connected by fillets 400 to the inner 200 and outer 100 walls of the channel which it delimits. The width of a passageway is to be taken as the width e of the passageway over the part corresponding to these straight line segments L located between the connecting fillets 400.

Additionally, it will be noted that when all the channels are identical within one same crown, which is the case in FIGS. 2A and 3, they are preferably all positioned identically on the crown, for reasons of symmetry.

The invention claimed is:

1. A filtering element (I) for filtering a fluid medium, comprising a rigid porous support (1) of cylindrical shape having a longitudinal central axis (A) and comprising a plurality of channels ($C_{11}$, $C_{21}$, $C_{22}$ ... $C_{31}$, $C_{32}$ ... $C_{n1}$, $C_{n2}$ ... ) for the circulation of the fluid medium to be filtered in order to collect a filtrate on the periphery of the support (1), said channels ($C_{11}$, $C_{21}$, $C_{22}$ ... $C_{31}$, $C_{32}$ ... $C_{n1}$, $C_{n2}$) being arranged in the support (1) parallel to the central axis (A) thereof and defining at least three filtering zones ($F_1$, $F_2$ ... $F_n$) which are concentrically distributed and separated from each other by a continuous porous zone ($Z_1$, $Z_2$ ... $Z_{n-1}$), wherein the filtering zones solely consist of one circular central channel ($C_{11}$) alone defining a filtering zone ($F_1$) and a series of filtering zones ($F_2$, ... $F_n$) each corresponding to a filtration crown which comprises several channels ($C_{21}$, $C_{22}$ ... $C_{31}$, $C_{32}$ ... $C_{n1}$, $C_{n2}$) and in which the channels are separated by flow-through partitions (P) for the filtrate, the filtration crowns being distributed concentrically to the central channel ($C_{11}$), the continuous porous zone ($Z_1$, $Z_2$ ... $Z_{n-1}$) do not include the flow-through partitions (P) separating the channels of the filtration crowns, characterized in that the mean thickness of the porous zone ($Z_1$) the closest to the central axis (A) is smaller than the mean thickness of the porous zone ($Z_{n-1}$) the closest to the periphery of the support (1) and, in the direction moving away from the central axis (A) of the support towards its periphery, the mean thickness of a porous zone is either identical to the next, or smaller, and either the continuous porous zone ($Z_1$, $Z_2$ ... $Z_{n-1}$) and the flow-through partitions (P) are formed only by a porous material or there are no openings formed in the continuous porous zone ($Z_1$, $Z_2$ ... $Z_{n-1}$) and the flow-through partitions (P), wherein widths (l) of the flow-through partitions (P) are equal within one same crown and equal from one crown to another.

2. The filtering element (I) according to claim 1 characterized in that the continuous porous zone ($Z_1$, $Z_2$ ... $Z_{n-1}$) corresponds to the zone lying between the outer envelope of a filtering zone and the inner envelope of the adjacent filtering zone in the direction of the periphery of the support (1).

3. The filtering element (I) according to claim 2 characterized in that:

for each of the filtering zones, the inner points of each channel for one same filtering zone are located on a circle whose centre is the centre of the support, and this circle defines the inner envelope of said filtering zone, for each of the filtering zones, the outer points of each channel of one same filtering zone are located on a circle whose centre is the centre of the support, and this circle defines the outer envelope of said filtering zone, each porous zone is delimited by two concentric circles and is of constant thickness.

4. The filtering element (I) according to claim 1 characterized in that the thickness between two adjacent continuous porous zones ($Z_1$ and $Z_2$ ... $Z_{n-2}$ et $Z_{n-1}$) of different mean thickness varies by a factor of 1.01 to 3.00 in the direction moving away from the longitudinal central axis (A) towards the periphery of the support (1).

5. The filtering element (I) according to claim 4, wherein the factor ranges between 1.10 and 1.70.

6. The filtering element (I) according to claim 1 characterized in that the ratio between the mean thickness of the porous zone the closest to the periphery of the support over the mean thickness of the porous zone closest to the central axis lies in the range of 1.1 to 6.

7. The filtering element (I) according to claim 6, wherein the ratio ranges from 1.2 to 2.5.

8. The filtering element (I) according to claim 1 characterized in that the mean thickness of the peripheral zone (Zp) separating the outer surface ($1_1$) of the support (1) and the filtering zone ($F_n$) the closest to the outer surface of the support (1) is greater than the mean thickness of the porous zone ($Z_{n-1}$) separating the filtering zone ($F_n$) the closest to the outer surface of the support (1) and the adjacent filtering zone ($F_{n-1}$).

9. The filtering element (I) according to claim 1 characterized in that the channels ($C_{n1}$, $C_{n2}$ ... ) of one same filtering zone with several channels are all identical.

10. The filtering element (I) according to claim 1 characterized in that the width (l) of each flow-through partition (P) is constant over its entire length.

11. The filtering element (I) according to claim 1 characterized in that the filtration crowns ($F_2$, $F_3$ ... $F_n$) are distributed over concentric circles.

12. The filtering element (I) according to claim 1 characterized in that in each filtration crown ($F_2$, $F_3$ ... $F_n$), the channels are of circular cross-section.

13. The filtering element (I) according to claim 1 characterized in that in each filtration crown ($F_2$, $F_3$ ... $F_n$) the channels are of non-circular cross-section.

14. The filtering element (I) according to claim 13 wherein in each filtration crown ($F_2$, $F_3$ ... $F_n$), the channels are of trapezoidal cross-section.

15. The filtering element (I) according to claim 1 characterized in that the different channels of the filtration crowns have a radial axis of symmetry relative to the centre of the support.

16. The filtering element (I) according to claim 1 characterized in that it comprises at least four filtration crowns ($F_2$, $F_3$, $F_4$, ... $F_n$).

17. The filtering element (I) according to claim 1 characterized in that the number of channels present in each filtering zone increases in the direction moving away from the centre (A) towards the periphery ($1_1$) of the support (1).

18. The filtering element (I) according to claim 1 characterized in that the support (1) is of circular or polygonal cross-section.

19. The filtering element (I) according to claim 1 characterized in that the surface (2) of the channels ($C_{11}$, $C_{21}$, $C_{22}$ ... $C_{31}$, $C_{32}$ ... $C_{n1}$, $C_{n2}$ ... ) is coated with at least one inorganic filtration layer.

20. The filtering element (I) according to claim 1, wherein there are no openings in the continuous pore zone ($Z_1$, $Z_2$ ... $Z_{n-1}$) and in the flow-through partitions (P).

21. The filtering element (I) according to claim 1, wherein the continuous porous zone ($Z_1$, $Z_2$ ... $Z_{n-1}$) and the flow-through partitions (P) are formed only by a porous material.

\* \* \* \* \*